US012602596B2

(12) United States Patent
Lee et al.

(10) Patent No.: US 12,602,596 B2
(45) Date of Patent: Apr. 14, 2026

(54) APPARATUS AND METHOD FOR VALIDATING DATASET BASED ON FEATURE COVERAGE

(71) Applicant: AJOU UNIVERSITY INDUSTRY-ACADEMIC COOPERATION FOUNDATION, Suwon-si (KR)

(72) Inventors: Jung Won Lee, Seoul (KR); Ye Seul Park, Incheon (KR); Chang Nam Lim, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 1119 days.

(21) Appl. No.: 17/455,325

(22) Filed: Nov. 17, 2021

(65) Prior Publication Data

US 2022/0207380 A1 Jun. 30, 2022

(30) Foreign Application Priority Data

Dec. 24, 2020 (KR) ........................ 10-2020-0182889

(51) Int. Cl.
*G06N 5/022* (2023.01)
*G06F 16/28* (2019.01)
(52) U.S. Cl.
CPC ........... *G06N 5/022* (2013.01); *G06F 16/285* (2019.01)

(58) Field of Classification Search
CPC .......... G06N 5/022; G06N 20/00; G06N 5/02; G06F 16/285; G06V 10/774; G06V 10/776
See application file for complete search history.

(56) References Cited

U.S. PATENT DOCUMENTS

| | | | | |
|---|---|---|---|---|
| 7,957,959 | B2 * | 6/2011 | Han | ........................ G10L 25/90 704/209 |
| 2008/0059156 | A1 * | 3/2008 | Han | ........................ G10L 15/08 704/207 |
| 2020/0302234 | A1 * | 9/2020 | Walters | ............... G06F 16/9035 |
| 2021/0392106 | A1 * | 12/2021 | Rajeev | ................... G06N 20/00 |
| 2022/0108210 | A1 * | 4/2022 | Wijaya | ............... G06F 11/3409 |

FOREIGN PATENT DOCUMENTS

| | | |
|---|---|---|
| KR | 10-1680055 B1 | 11/2016 |
| KR | 10-2017-0113619 A | 10/2017 |

OTHER PUBLICATIONS

Request for the submission of an Opinion dated Nov. 16, 2022 from the Korean Intellectual Property Office in KR Application No. 10-2020-0182889.

* cited by examiner

*Primary Examiner* — Jennifer N Welch
*Assistant Examiner* — Amy P Hoang
(74) *Attorney, Agent, or Firm* — Sughrue Mion, PLLC

(57) ABSTRACT

A dataset validating method based on a feature coverage according to an exemplary embodiment of the present disclosure includes extracting a feature of a first dataset including a plurality of data using a classification model trained for a predetermined second dataset; clustering labels of the first dataset according to the extracted feature; and validating a coverage of a partial dataset which is a part selected from the first dataset based on the clustering result.

8 Claims, 4 Drawing Sheets

[FIG. 1]
[FIG. 2]
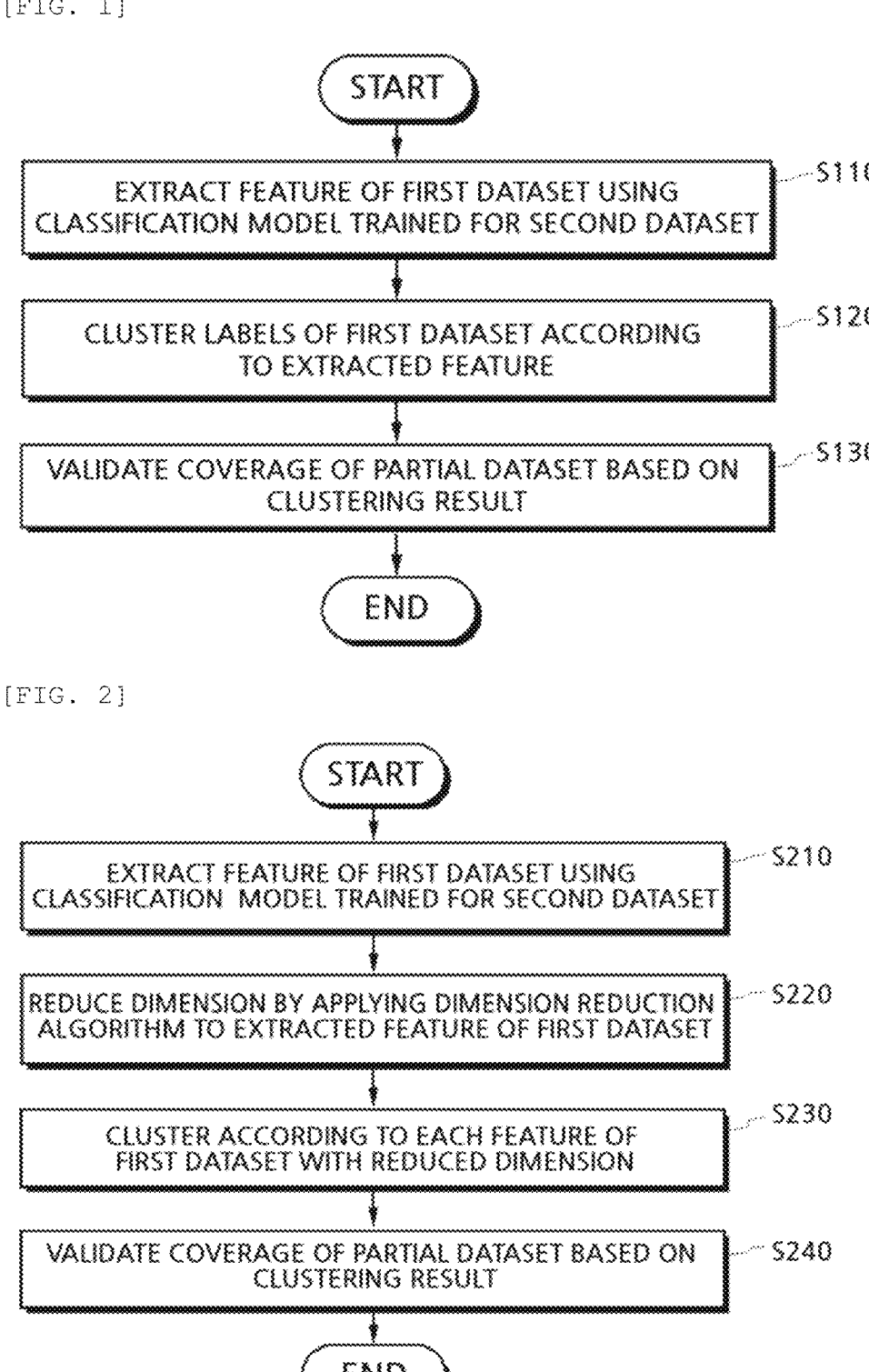

[FIG. 3]

```
                    ┌─────────────┐
                    │    START    │
                    └──────┬──────┘
                           ↓
    ┌──────────────────────────────────────────────┐ ── S310
    │ EXTRACT FEATURE OF FIRST DATASET USING        │
    │ CLASSIFICATION MODEL TRAINED FOR SECOND       │
    │ DATASET                                       │
    └──────────────────────┬───────────────────────┘
                           ↓
    ┌──────────────────────────────────────────────┐ ── S320
    │ CLUSTER LABELS OF FIRST DATASET ACCORDING     │
    │ TO EXTRACTED FEATURE                          │
    └──────────────────────┬───────────────────────┘
                           ↓
    ┌──────────────────────────────────────────────┐ ── S330
    │ SELECT PARTIAL DATASET SO AS TO CORRESPOND    │
    │ TO CLUSTERING RESULT                          │
    └──────────────────────┬───────────────────────┘
                           ↓
                    ┌─────────────┐
                    │     END     │
                    └─────────────┘
```

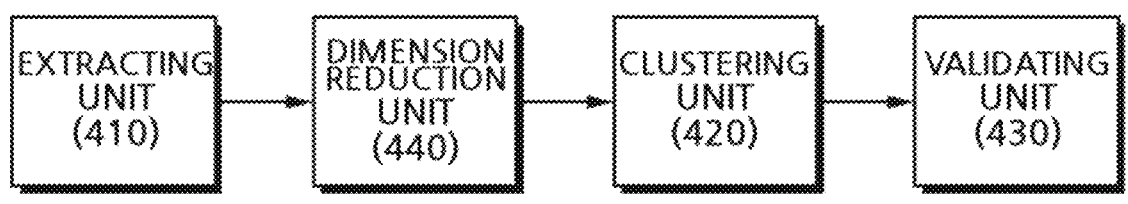

[FIG. 6]
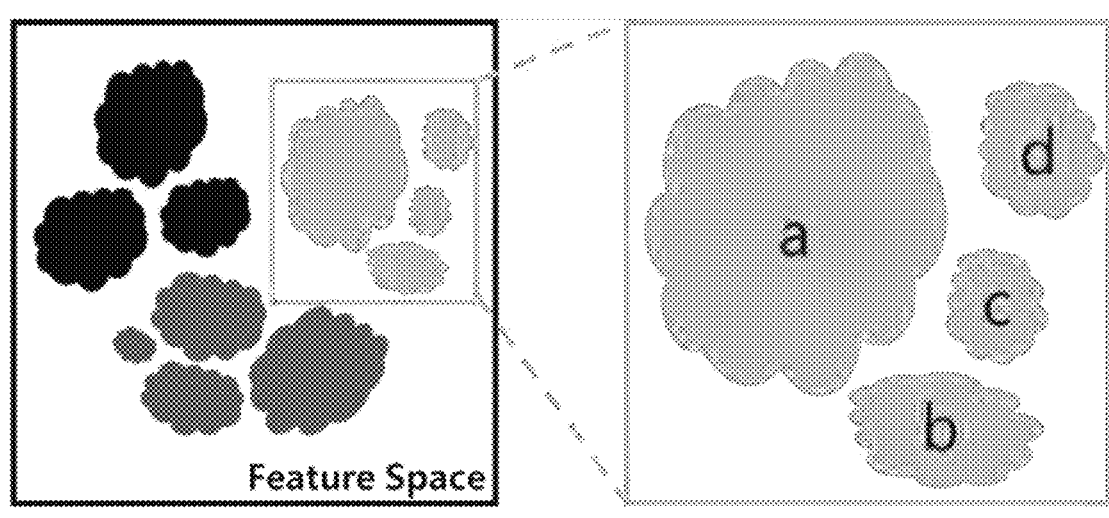
[FIG. 7]
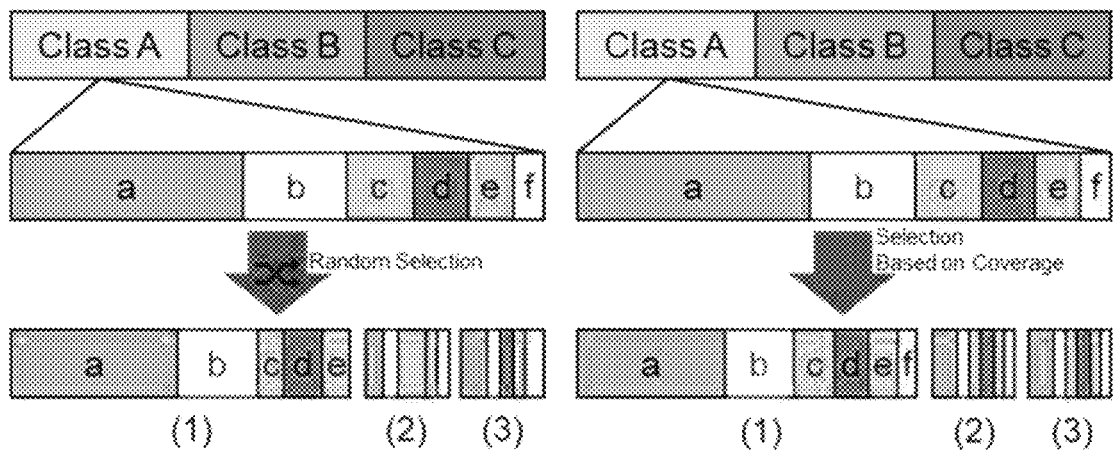
(1): Training Set, (2): Validation Set, (3): Test Set

[FIG. 8]
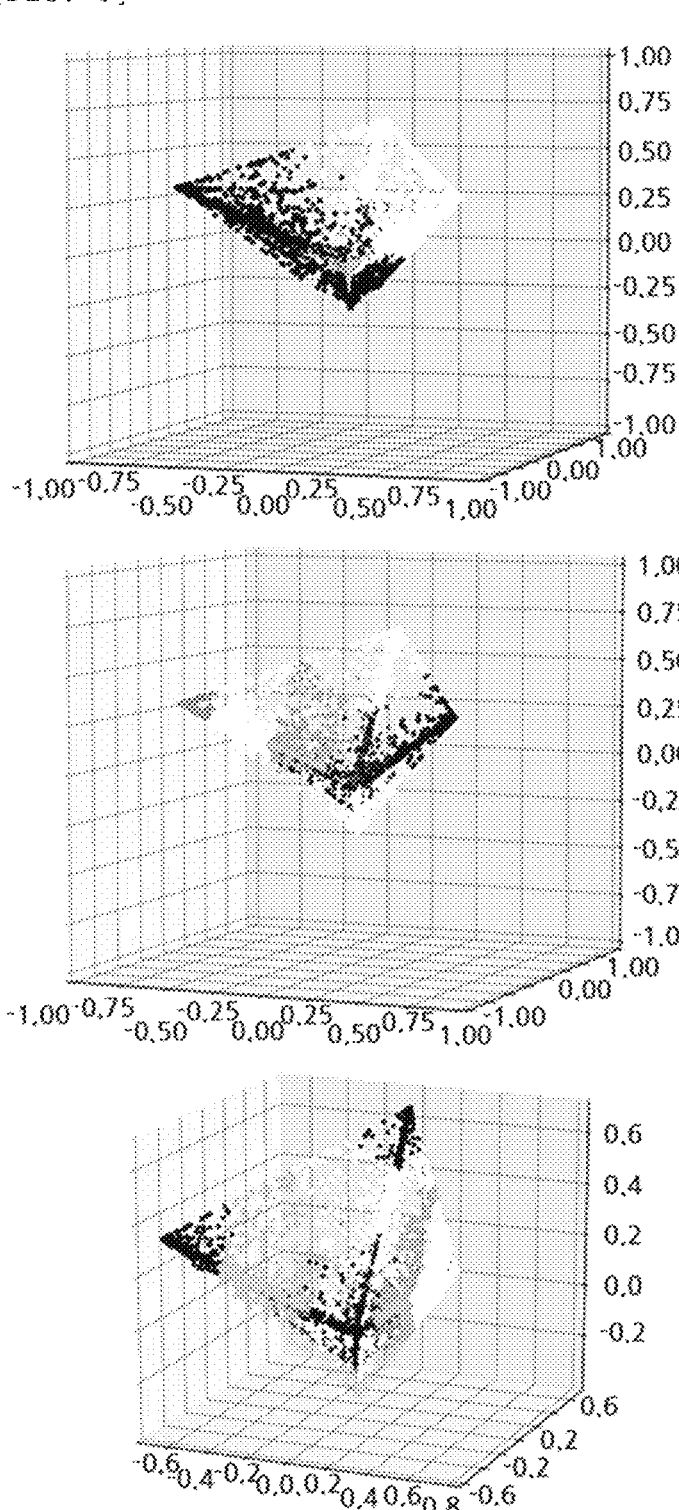

APPARATUS AND METHOD FOR VALIDATING DATASET BASED ON FEATURE COVERAGE

CROSS-REFERENCE TO RELATED APPLICATIONS

This application claims the priority of Korean Patent Application No. 10-2020-0182889 filed on Dec. 24, 2020, in the Korean Intellectual Property Office, the disclosure of which is incorporated herein by reference.

BACKGROUND

Field

The present disclosure relates to a method and an apparatus for validating a dataset based on a feature coverage.

Description of the Related Art

Recently, in many fields, machine learning, especially, a deep learning technique is being used to classify images. The machine learning is an algorithm of learning and predicting based on data and creates a mathematical model using input data to make prediction or decision.

When the model is constructed, generally, entire datasets are used to be divided into a plurality of types, and specifically, a method of configuring the dataset with three set, that is, a training set, a validation set, and a test set is usually used. The training set is used for learning of the model, the verification set is used to adjust a hyper parameter, and the test set is used to measure a performance of the model. Only when each dataset includes all the features of the entire datasets, a performance and an evaluation result of the completed model may be reliable.

However, currently, there is no criterion to evaluate how many characteristics of the entire datasets are included in the datasets. Further, generally, the entire datasets are randomly divided to generate datasets for training, validation, and test or a cross-validation technique is used to generate datasets, but these methods have a problem in that the features of the entire datasets are not considered.

Accordingly, a necessity for a method and an apparatus for evaluating or generating datasets based on a feature coverage comes to the fore so as to completely reflect the features of the entire datasets.

SUMMARY

The present disclosure provides a method and an apparatus of validating how many features of the entire datasets are reflected by a specific dataset, by extracting and clustering features of the entire datasets to calculate a coverage.

Further, the present disclosure provides a method and an apparatus for generating a dataset which completely reflects features of the entire datasets based on a feature coverage.

Problems to be solved by the present disclosure are not limited to the above-mentioned problem(s), and other problem(s), which is (are) not mentioned above, can be clearly understood by those skilled in the art from the following descriptions.

According to an aspect of the present disclosure, a dataset validating method based on a feature coverage includes extracting a feature of a first dataset including a plurality of data using a classification model trained for a predetermined second dataset; clustering labels of the first dataset according to the extracted feature; and validating a coverage of a partial dataset which is a part selected from the first dataset based on the clustering result.

Desirably, between the extracting of a feature of a first dataset and the clustering, the method further includes reducing a dimension by applying a predetermined dimension reduction algorithm to the extracted feature of the first dataset, and in the clustering, the clustering may be performed according to each feature of the first dataset with a reduced dimension.

Desirably, the second dataset is an arbitrary dataset having a plurality of data which is the same type as the first dataset and the classification model is an arbitrary learning model.

Desirably, in the clustering, a clustering algorithm, or the number of clusterings is independently set for each label.

Further, according to an aspect of the present disclosure, a dataset generating method based on a feature coverage includes extracting a feature of a first dataset including a plurality of data using a classification model trained for a predetermined second dataset; clustering labels of the first dataset according to the extracted feature; and selecting a partial dataset which is a part of the first dataset so as to correspond to the clustering result.

Further, according to an aspect of the present disclosure, a dataset validating apparatus based on a feature coverage includes an extracting unit which extracts a feature of a first dataset including a plurality of data using a classification model trained for a predetermined second dataset; a clustering unit which clusters labels of the first dataset according to the extracted feature; and a validating unit which validates a coverage of a partial dataset which is a part selected from the first dataset based on the clustering result.

Desirably, the apparatus further includes a dimension reduction unit which reduces a dimension by applying a predetermined dimension reduction algorithm to the extracted feature of the first dataset, and the clustering unit may perform the clustering according to each feature of the first dataset with a reduced dimension.

Desirably, the second dataset is an arbitrary dataset having a plurality of data which is the same type as the first dataset and the classification model may be an arbitrary learning model.

Desirably, the clustering unit may independently set, a clustering algorithm or the number of clusterings for each label.

According to an aspect of the present disclosure, a dataset generating apparatus based on a feature coverage includes a classifying unit which extracts a feature of a first dataset including a plurality of data using a classification model trained for a predetermined second dataset; a clustering unit which clusters labels of the first dataset according to the extracted feature; and a generating unit which selects a partial dataset which is a part of the first dataset so as to correspond to the clustering result.

The method and the apparatus for validating a dataset based on a feature coverage according to an exemplary embodiment of the present disclosure extract and cluster features of the entire datasets to calculate a coverage to validate how many features of the entire datasets are reflected by a specific dataset, thereby validating a stability of the model.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1 is a flowchart for explaining a dataset validating method based on a feature coverage according to an exemplary embodiment of the present disclosure;

FIG. 2 is a flowchart for explaining a dataset validating method based on a feature coverage according to another exemplary embodiment of the present disclosure;

FIG. 3 is a flowchart for explaining a dataset generating method based on a feature coverage according to an exemplary embodiment of the present disclosure;

FIG. 4 is a block diagram for explaining a dataset validating apparatus based on a feature coverage according to an exemplary embodiment of the present disclosure;

FIG. 5 is a block diagram for explaining a dataset generating apparatus based on a feature coverage according to an exemplary embodiment of the present disclosure;

FIG. 6 is a view for explaining a relationship between a label and a feature according to an exemplary embodiment of the present disclosure;

FIG. 7 is a view for explaining features of the related art and the present disclosure by comparing them; and FIG. 8 is a view for explaining a clustering result according to an exemplary embodiment of the present disclosure.

DETAILED DESCRIPTION OF THE EMBODIMENT

Those skilled in the art may make various modifications to the present disclosure and the present disclosure may have various embodiments thereof, and thus specific embodiments will be illustrated in the drawings and described in detail in detailed description. However, this does not limit the present disclosure within specific exemplary embodiments, and it should be understood that the present disclosure covers all the modifications, equivalents and replacements within the spirit and technical scope of the present disclosure. In the description of respective drawings, similar reference numerals designate similar elements.

Terms used in the present application are used only to describe a specific exemplary embodiment, but are not intended to limit the present invention. A singular form may include a plural form if there is no clearly opposite meaning in the context. In the present disclosure, it should be understood that terminology "include" or "have" indicates that a feature, a number, a step, an operation, a component, a part or the combination thoseof described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

FIG. 1 is a flowchart for explaining a dataset validating method based on a feature coverage according to an exemplary embodiment of the present disclosure.

In step S110, a dataset validating apparatus extracts a feature of a first dataset including a plurality of data using a classification model trained for a predetermined second dataset.

That is, the dataset validating apparatus classifies the plurality of data included in the first dataset using a classification model and as a result, extracts a feature from each of the plurality of data.

At this time, when the dimensionality of the extracted feature exceeds a predetermined dimensionality, the dataset validating apparatus further performs dimension reduction if necessary, which will be described in more detail in the description of FIG. 2.

According to another exemplary embodiment, the second dataset is an arbitrary dataset including a plurality of data which is the same type as the first dataset and the classification model may be an arbitrary learning model.

For example, when the first dataset includes image data, the second dataset also may include image data. For example, when the first dataset includes text data, the second dataset also may include text data.

Further, the classification model may be an arbitrary learning model which classifies data included in the first dataset and the second dataset. For example, the classification model may be a convolution neural network (CNN), a recurrent neural network (RNN), a support vector machine (SVM), a decision tree, or the like.

In step S120, the dataset validating apparatus clusters labels of the first dataset according to the extracted features.

That is, the dataset validating apparatus may cluster data having the same label according to the extracted feature. At this time, labeling for each of the plurality of data included in the first dataset may be performed by the dataset validating apparatus, prior to the step S120, or may be set in advance.

For example, the dataset validating apparatus may cluster image data having the same label using information about a histogram of RGB colors. That is, the dataset validating apparatus defines six values with respect to an average and a deviation for every channel of RGB as features and then may cluster using each value.

As another example, referring to FIG. 6, when it is assumed that the same color indicates the same label, the dataset validating apparatus may classify and cluster blue labels into four features a, b, c, and d. Further, referring to FIG. 8, the dataset validating apparatus may cluster data having the same label by classifying the feature according to a color.

At this time, the dataset validating apparatus may also use various types of clustering algorithms including a K-means algorithm.

According to another exemplary embodiment, the dataset validating apparatus may independently set a clustering algorithm or the number of clusterings for each label.

Moreover, the dataset validating apparatus may independently set a clustering algorithm and the number of clusterings for individual labels.

For example, according to the above-described features, the dataset validating apparatus may generate M clusters for a label A with an X clustering algorithm and generate N clusters for a label B with a Y clustering algorithm.

Finally, in step S130, the dataset validating apparatus validates a coverage of a partial dataset which is a part selected from the first dataset based on the clustering result.

That is, the dataset validating apparatus confirms a cluster of a label in which individual data included in the partial dataset is included to validate how much the partial dataset covers a feature coverage corresponding to a label and a cluster.

For example, it is assumed that there are three labels A, B, C, and the label A has clusters (features) a and b, the label B has clusters c, d, and e, and the label C has clusters f, g, h, and i. At this time, the dataset validating apparatus checks whether individual data included in the partial dataset is distributed in all the clusters a, b, c, d, e, f, g, h, and i to validate the coverage.

At this time, the dataset validating apparatus may calculate the coverage to have a value which is equal to or smaller than 1, using a ratio of the number of clusters in which data of the partial dataset is distributed and a number of entire clusters.

Moreover, the dataset validating apparatus determines whether a distribution ratio of data included in the partial dataset for every cluster matches a distribution ratio of data included in the entire datasets for every cluster within a predetermined range to perform the validation.

Further, referring to FIG. 7, the dataset validating apparatus may determine that a right side in which data included in the label A (class A) is selected based on a coverage is more excellent than a left side in which a training dataset (training set) is configured by randomly selecting data included in the label A (class A).

FIG. 2 is a flowchart for explaining a dataset validating method based on a feature coverage according to another exemplary embodiment of the present disclosure.

In step S210, a dataset validating apparatus extracts a feature of a first dataset including a plurality of data using a classification model trained for a predetermined second dataset.

In step S220, the dataset validating apparatus applies a predetermined dimension reduction algorithm to the extracted feature of the first dataset to reduce the dimension.

For example, in step S210, when the dimensionality of the extracted feature exceeds a predetermined dimensionality, the dataset validating apparatus applies the dimension reduction algorithm to reduce the dimension. This is because when the dimensionality of the feature is too many, a lot of computing resources and times are consumed to cluster the data.

In step S230, the dataset validating apparatus clusters each of labels of the first dataset according to the extracted features.

At this time, the dataset validating apparatus may cluster data with respect to each feature of the first dataset whose dimension is reduced in step S220.

Finally, in step S240, the dataset validating apparatus validates a coverage of a partial dataset which is a part selected from the first dataset based on the clustering result.

FIG. 3 is a flowchart for explaining a dataset generating method based on a feature coverage according to an exemplary embodiment of the present disclosure.

In step S310, a dataset validating apparatus extracts a feature of a first dataset including a plurality of data using a classification model trained for a predetermined second dataset.

In step S320, the dataset validating apparatus clusters labels of the first dataset according to the extracted features.

Finally, in step S330, the dataset validating apparatus selects a partial dataset which is a part of the first dataset so as to correspond to the clustering result.

That is, the dataset validating apparatus may generate the partial dataset from the first dataset so that the data included in the partial dataset is included in all the clusters which are clustered in advance.

For example, it is assumed that there are three labels A, B, C, and the label A has clusters (features) a and b, the label B has clusters c, d, and e, and the label C has clusters f, g, h, and i. At this time, the dataset validating apparatus may generate the partial dataset such that data included in the partial dataset is distributed in all the clusters a, b, c, d, e, f, g, h, and i.

Moreover, the dataset validating apparatus may generate the partial dataset such that the distribution ratio for every cluster of the data included in the partial dataset matches a distribution ratio for every cluster of the data included in the entire datasets within a predetermined range.

FIG. 4 is a block diagram for explaining a dataset validating apparatus based on a feature coverage according to an exemplary embodiment of the present disclosure.

Referring to FIG. 4, a dataset validating apparatus 400 based on a feature coverage according to an exemplary embodiment of the present disclosure includes an extracting unit 410, a clustering unit 420, and a validating unit 430. Further, the dataset validating apparatus may further include a dimension reduction unit 440 as an option.

In the meantime, the dataset validating apparatus 400 based on a feature coverage according to the exemplary embodiment of the present disclosure may be mounted in a computing device such as a server computer, a desktop PC, a notebook PC, a smart phone, a tablet, and a wearable device.

The extracting unit 410 extracts a feature of a first dataset including a plurality of data using a classification model trained for a predetermined second dataset.

The clustering unit 420 clusters the labels of the first dataset according to the extracted feature.

The validating unit 430 validates a coverage of a partial dataset which is a part selected from the first dataset, based on the clustering result.

The dimension reduction unit 440 applies a predetermined dimension reduction algorithm to the extracted feature of the first dataset to reduce the dimension.

At this time, the clustering unit 420 may cluster with respect to each feature of the first dataset with a reduced dimension.

According to another exemplary embodiment, the second dataset is an arbitrary dataset including a plurality of data which is the same type as the first dataset and the classification model may be an arbitrary learning model.

According to still another exemplary embodiment, the clustering unit 420 may independently set a clustering algorithm or the number of clusterings for each label.

FIG. 5 is a block diagram for explaining a dataset generating apparatus based on a feature coverage according to an exemplary embodiment of the present disclosure.

Referring to FIG. 5, a dataset generating apparatus 500 based on a feature coverage according to an exemplary embodiment of the present disclosure includes a classifying unit 510, a clustering unit 520, and a generating unit 530.

In the meantime, the dataset generating apparatus 500 based on a feature coverage according to the exemplary embodiment of the present disclosure may be mounted in a computing device such as a server computer, a desktop PC, a notebook PC, a smart phone, a tablet, and a wearable device.

The classifying unit 510 extracts a feature of a first dataset including a plurality of data using a classification model trained for a predetermined second dataset.

The clustering unit 520 clusters the labels of the first dataset according to the extracted feature.

The generating unit 530 selects a partial dataset which is a part of the first dataset so as to correspond to the clustering result.

The above-described method may be implemented through various methods. For example, the exemplary embodiments of the present disclosure may be implemented by a hardware, a firm ware, a software, and a combination thereof.

When the exemplary embodiment is implemented by the hardware, the method according to the exemplary embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, or the like.

When the exemplary embodiment is implemented by the firmware or the software, the method according to the exemplary embodiment of the present disclosure may be implemented by a module, a procedure, or a function which performs a function or operations described above. The software code is stored in the memory unit to be driven by the processor. The memory unit is located inside or outside the processor and may exchange data with the processor, by various known units.

Exemplary embodiments disclosed in the specification have been described above with reference to the accompanying drawings. However, the exemplary embodiments illustrated in drawing are not restrictively interpreted but may be interpreted such that the exemplary embodiments may be combined by those skilled in the art and if the exemplary embodiments are combined, some constituent elements may be omitted.

Here, terms or words which have been used in the specification and claims may not be interpreted to be limited to typical meanings or lexical meanings but may be interpreted to have meanings and concepts which comply with the technical spirit disclosed in the specification.

Therefore, the embodiments disclosed in the specification and the configurations illustrated in the drawings are just exemplary embodiments of the present disclosure and do not fully represent the technical spirit described in this specification. Therefore, it should be appreciated that various equivalents and modified examples capable of substituting them can be made.

What is claimed is:

1. A dataset validating method based on a feature coverage and performed by a dataset validating apparatus comprising a hardware processor and a memory storing instructions executable by the hardware processor, the method comprising:

providing a first dataset to a classification model to extract a plurality of features of data included in the first dataset, the classification model being stored in the memory and trained, using a predetermined second dataset, to extract a feature of input data;

providing the extracted plurality of features to a predetermined dimension reduction algorithm stored in the memory to reduce a dimension of the plurality of features to less than or equal to a predetermined dimension;

clustering the dimension-reduced plurality of features into a plurality of clusters, wherein each label of a plurality of labels includes at least two clusters from among the plurality of clusters, the plurality of labels being classification results for input data of the classification model;

validating a coverage of a partial dataset which is a part selected from the first dataset based on the clustering result, by confirming a cluster of a label in which individual data included in the partial dataset is included to validate how much the partial dataset covers a feature coverage corresponding to a label and a cluster; and storing the coverage in the memory, wherein the coverage is defined as a ratio of the number of clusters included in the partial dataset and a total number of clusters.

2. The dataset validating method according to claim 1, wherein the second dataset is an arbitrary dataset having a plurality of data which is the same type as the first dataset and the classification model is an arbitrary learning model.

3. The dataset validating method according to claim 1, wherein in the clustering, a clustering algorithm or the number of clusterings is independently set for each label.

4. A dataset generating method based on a feature coverage and performed by a dataset generating apparatus comprising a hardware processor and a memory storing instructions executable by the hardware processor, the method comprising:

providing a first dataset to a classification model to extract a plurality of features of data included in the first dataset, the classification model being stored in the memory and trained, using a predetermined second dataset, to extract a feature of input data;

providing the extracted plurality of features to a predetermined dimension reduction algorithm to reduce a dimension of the plurality of features to less than or equal to a predetermined dimension;

clustering the dimension-reduced plurality of features into a plurality of clusters, wherein each label of a plurality of labels includes at least two clusters from among the plurality of clusters, the plurality of labels being classification results for input data of the classification model; and selecting a partial dataset which is a part of the first dataset, and storing the partial dataset in the memory, wherein the partial dataset is selected such that data included in the partial dataset is distributed in all the clusters and a distribution ratio for the data included in the partial dataset over the clusters corresponds to a distribution ratio of the first dataset within a predetermined range.

5. A dataset validating apparatus based on a feature coverage, the dataset validating apparatus comprising:

a hardware processor; and a memory storing instructions executable by the hardware processor, a classification model, and a predetermined dimension reduction algorithm, wherein the hardware processor is configured to:

provide a first dataset to the classification model to extract a plurality of features of data included in the first dataset, the classification model being trained, using a predetermined second dataset, to extract a feature of input data, provide the extracted plurality of features to the predetermined dimension reduction algorithm to reduce a dimension of the plurality of features to less than or equal to a predetermined dimension, cluster the dimension-reduced plurality of features into a plurality of clusters, wherein each label of a plurality of labels includes at least two clusters from among the plurality of clusters, the plurality of labels being classification results for input data of the classification model, validate a coverage of a partial dataset which is a part selected from the first dataset based on the clustering result, by confirming a cluster of a label in which individual data included in the partial dataset is included to validate how much the partial dataset covers a feature coverage corresponding to a label and a cluster, and store the coverage in the memory, wherein the coverage is defined as a ratio of the number of clusters included in the partial dataset and a total number of clusters.

6. The dataset validating apparatus according to claim 5, wherein the second dataset is an arbitrary dataset having a plurality of data which is the same type as the first dataset and the classification model is an arbitrary learning model.

7. The dataset validating apparatus according to claim 5, wherein the hardware processor is further configured to independently set a clustering algorithm or the number of clusterings for each label.

8. A dataset generating apparatus based on a feature coverage, the apparatus comprising:

a hardware processor; and a memory storing instructions executable by the hardware processor, and a classification model, wherein the hardware processor is configured to:

provide a first dataset to the classification model to extract a plurality of features of data included in the first dataset, the classification model being trained, using a predetermined second dataset, to extract a feature of input data, provide the extracted plurality of features to a predetermined dimension reduction algorithm to reduce a dimension of the plurality of features to less than or equal to a predetermined dimension, cluster the dimension-reduced plurality of features into a plurality of clusters, wherein each label of a plurality of labels includes at least two clusters from among the plurality of clusters, the plurality of labels being classification results for input data of the classification model, select a partial dataset which is a part of the first dataset, and store the partial dataset in the memory, wherein the partial dataset is selected such that data included in the partial dataset is distributed in all the clusters and a distribution ratio for the data included in the partial dataset over the clusters corresponds to a distribution ratio of the first dataset within a predetermined range.

\* \* \* \* \*